I

US008621171B2

(12) United States Patent
Burka et al.

(10) Patent No.: US 8,621,171 B2
(45) Date of Patent: Dec. 31, 2013

(54) COMPACTION PLANNING

(75) Inventors: Peter Wiebe Burka, Ottawa (CA);
Jeffrey Michael Disher, Ottawa (CA);
Daryl James Maier, Unioville (CA);
Aleksandar Micic, Ottawa (CA); Ryan Andrew Sciampacone, Nepean (CA)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 13/023,426

(22) Filed: Feb. 8, 2011

(65) Prior Publication Data
US 2012/0203991 A1 Aug. 9, 2012

(51) Int. Cl.
*G06F 12/00* (2006.01)
(52) U.S. Cl.
USPC .... 711/165; 711/162; 711/170; 711/E12.002; 707/813; 707/817
(58) Field of Classification Search
USPC .......... 711/162, 165, 170, E12.002; 707/813, 707/817
See application file for complete search history.

(56) References Cited

U.S. PATENT DOCUMENTS

| | | | |
|---|---|---|---|
| 6,865,585 B1 | 3/2005 | Dussud | |
| 7,469,324 B2 | 12/2008 | Tene et al. | |
| 7,533,228 B1 * | 5/2009 | Garthwaite | 711/159 |
| 7,716,258 B2 | 5/2010 | Dussud | |
| 2003/0069905 A1 * | 4/2003 | Dussud | 707/206 |
| 2007/0294499 A1 | 12/2007 | Garthwaite | |

OTHER PUBLICATIONS

Liu, et al. "Space-and-Time Efficient Parallel Garbage Collector for Data-Intensive Applications." International Journal of Parallel Programming, DOI 10.1007/s10766-010-0151-4, Oct. 2010.
Abuaiadh, et al., "An Efficient Parallel Heap Compaction Algorithm", Proceedings of the 19th Annual ACM SIGPLAN Conference on Object-Oriented Programming, Systems, Languages, and Applications, 2004.
Kermany, et al., "The Compressor: Concurrent, Incremental, and Parallel Compaction", PLDI'06, pp. 354-363, 2006.

\* cited by examiner

*Primary Examiner* — Jasmine Song
(74) *Attorney, Agent, or Firm* — Nelson and Nelson; Daniel P. Nelson; Alexis V. Nelson

(57) ABSTRACT

An illustrative embodiment of a computer-implemented process for compaction planning selects a source region from a set of regions to form a selected source region, initializes process data using information from the selected source region and responsive to a determination that a current destination is not NULL and not full, determines whether to atomically consume from a destination. Responsive to a determination to atomically consume from a destination, the computer-implemented process plans to evacuate into a consumed extent and updates the process data and responsive to a determination that the source region is empty, determines whether more work remains. Responsive to a determination that more work does not remain, the computer-implemented process generates a relocation table.

20 Claims, 6 Drawing Sheets

COMPACTION PLANNING

BACKGROUND

1. Technical Field

This disclosure relates generally to memory management in a data processing system and more specifically to compaction planning in a memory manager of the data processing system.

2. Description of the Related Art

A memory management system, which does not move objects, may be affected by memory fragmentation. One typical mechanism for resolving memory fragmentation is compaction.

Abuaiadh et al (Abuaiadh, Ossia, Petrank and Silbershtein, "An efficient parallel heap compaction algorithm", Proceedings of the 19th annual ACM SIGPLAN conference on Object-oriented programming, systems, languages, and applications, 2004) described, at the time, a state of the art compactor which is currently used in IBM® Java® Virtual Machines (IBM is a registered trademark of IBM in the United States, other countries or both; Java and all Java-based trademarks and logos are trademarks or registered trademarks of Oracle and/or its affiliates). The compactor uses a small amount of auxiliary storage, and claims to achieve "(almost) perfect compaction". However, in practice, "perfection" of the compaction typically decreases as parallelism increases. Each compactor thread must lock an associated destination area while the compactor thread evacuates into the respective destination area. While the respective destination area is locked, the area is not eligible to be an evacuation destination for other compactor threads, and the other compactor threads by-pass locked destination area and select a next available destination. The compactor may, therefore, leave some fragmentation as destination areas may become incompletely consumed.

Kermany and Petrank (Kermany and Petrank, "The Compressor: Concurrent, Incremental, and Parallel Compaction", PLDI'06, pp. 354-363, 2006) recently disclosed an advance in compactor design, which improves upon the compactor of Abuaiadh et al. The stop-the-world compactor of Kermany and Petrank divides compaction into two phases, which may be referred to as term "plan" and "move." During a planning phase, a new location of each object (or group of objects) is determined and recorded in a concise manner in an offset table. Once planning is complete, the data in a mark vector and the offset table can be combined to determine a destination of any object. The determination capability allows the move phase to move objects to predetermined destinations and fix up associated references to other objects at the same time. Thus the move phase is the only phase of the compactor, which reads or writes the heap. Planning and external fix-up do not need to read or write heap memory. The collector of Kermany and Petrank also includes a concurrent and incremental aspect, which is not considered in the present disclosure.

The plan task in the compactor of Kermany and Petrank is single threaded. While this does result in optimal planning, the single thread is typically a performance bottleneck. Kermany and Petrank claim the plan task can be parallelized using "simple tricks", but the tricks are not described nor do they describe the optimality of the resulting plan. Those skilled in the art of implementing parallel planning typically view parallelizing the planning stage as more than a simple trick involving non-obvious algorithms. For example, a simple solution mimics the algorithm used by Abuaiadh et al. However this results in suboptimal planning, with the problem becoming worse as parallelism increases.

In another prior example, a system designates each segregated area as the responsibility of a single thread and does not deal with cross-region compaction to provide ideal compaction. Further, the system is directed toward solving a problem of references between the segregated areas and how to track the areas thereby treating inter-region references different from references within the same region.

Another example system describes how to choose pages for compaction and relocate objects concurrently. The example system needs to perform reference fix-up operations. Optimizing object reference fix-up is typically an expensive part of a compaction operation in a garbage collected heap as is using thread locks.

Another prior example of a system deals primarily with how to determine and store information corresponding to pre-compaction location and size of a set of objects in a given extent of a heap (as well as how to avoid moving "dense prefixes" of objects).

In another example, a system relies on building a static dependency graph between blocks, which requires a pass to realize and build the dependency graph. Building the dependency graph typically causes a minimal set of concrete dependencies to be found (with few enough threads or a sufficiently shallow plan, it is possible for no thread to ever be blocked on another: thus, no dependencies are discovered). Secondly, the algorithm used in the example system requires single-threaded copying into a given destination block. Further, the algorithm typically relies on being able to slide objects to lower blocks in the address space, which creates unavoidable contention points in the dependency graph. There is therefore a need for a more effective compaction planning mechanism.

SUMMARY

According to one embodiment, a computer-implemented process for compaction planning selects a source region from a set of regions to form a selected source region, initializes process data using information from the selected source region and responsive to a determination that a current destination is not NULL and not full, determines whether to atomically consume from a destination. Responsive to a determination to atomically consume from a destination, the computer-implemented process plans to evacuate into a consumed extent and updates the process data and responsive to a determination that the source region is empty, determines whether more work remains. Responsive to a determination that more work does not remain, the computer-implemented process generates a relocation table.

According to another embodiment, a computer program product for compaction planning comprises a computer recordable-type media containing computer executable program code stored thereon. The computer executable program code comprises computer executable program code for selecting a source region from a set of regions to form a selected source region, computer executable program code for initializing process data using information from the selected source region, computer executable program code responsive to a determination that a current destination is not NULL and not full, for determining whether to atomically consume from destination, computer executable program code responsive to a determination to atomically consume from destination, for planning to evacuate into a consumed extent and updating the process data, computer executable program code responsive to a determination that the source region is empty, for determining whether more work remains and computer executable program code responsive to a determination that more work does not remain, for generating a relocation table.

According to another embodiment, an apparatus for compaction planning comprises a communications fabric, a memory connected to the communications fabric, wherein the memory contains computer executable program code, a communications unit connected to the communications fabric, an input/output unit connected to the communications fabric, a display connected to the communications fabric and a processor unit connected to the communications fabric. The processor unit executes the computer executable program code to direct the apparatus to select a source region from a set of regions to form a selected source region, initialize process data using information from the selected source region and responsive to a determination that a current destination is not NULL and not full, determines whether to atomically consume from a destination. The processor unit executes the computer executable program code to further direct the apparatus responsive to a determination to atomically consume from destination, to plan to evacuate into a consumed extent and updating the process data, and responsive to a determination that the source region is empty, to determine whether more work remains; and responsive to a determination that more work does not remain, generate a relocation table.

BRIEF DESCRIPTION OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
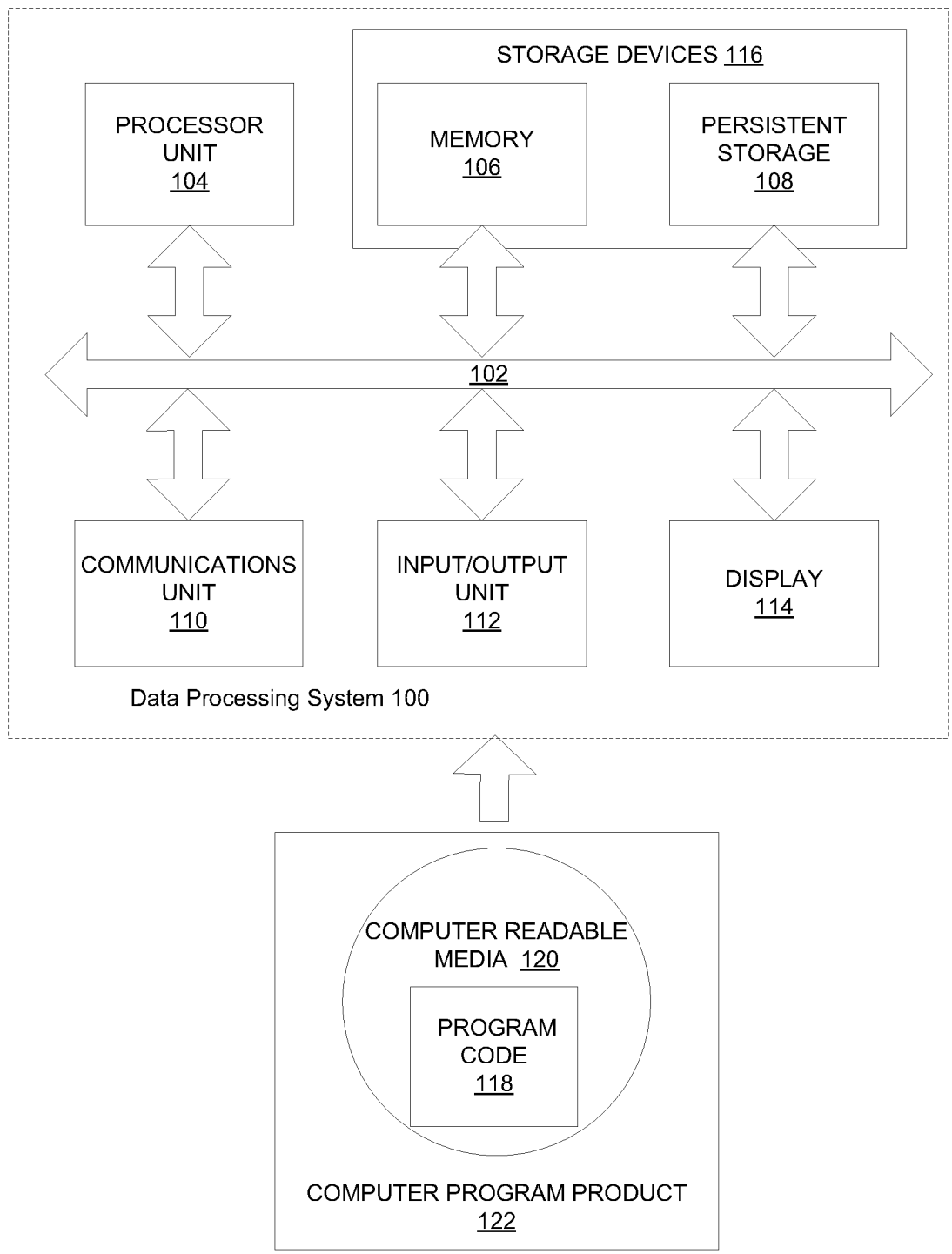
FIG. 1 is a block diagram of an exemplary data processing system operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Turning now to FIG. 1 a block diagram of an exemplary data processing system operable for various embodiments of the disclosure is presented. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instructions are in a functional form on persistent storage 108. These instructions may be loaded into memory 106 for execution by processor unit 104. The processes of the different embodiments may be performed by processor unit 104 using computer-implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 may be any hardware apparatus that may store data. Memory 106, persistent storage 108 and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

According to an illustrative embodiment, a computer-implemented process for compaction planning selects a source region from a set of regions to form a selected source region, initializes process data using information from the selected source region and responsive to a determination that a current destination is not NULL and not full, determines whether to atomically consume from a destination. Responsive to a determination to atomically consume from a destination, the computer-implemented process plans to evacuate into a consumed extent and updates the process data and responsive to a determination that the source region is empty, determines whether more work remains. Responsive to a determination that more work does not remain, the computer-implemented process generates a relocation table.

Using data processing system 100 of FIG. 1 as an example, an illustrative embodiment provides the computer-implemented process stored in memory 106, executed by processor unit 104, for compaction planning. Processor unit 104 selects a source region from a set of regions to form a selected source region. The set of regions may be obtained from communications unit 110, storage devices 116 or input/output unit 112. Processor unit 104 initializes process data using information from the selected source region and responsive to a determination that a current destination is not NULL and not full, determines whether to atomically consume from a destination. Responsive to a determination by processor unit 104 to atomically consume from a destination, processor unit 104 plans to evacuate into a consumed extent and updates the process data contained in memory 106. Responsive to a determination that the source region is empty, processor unit 104 determines whether more work remains. Responsive to a determination that more work does not remain, processor unit 104 generates a relocation table.

In an alternative embodiment, program code 118 containing the computer-implemented process may be stored within computer readable media 120 as computer program product 122. In another illustrative embodiment, the process for compaction planning may be implemented in an apparatus comprising a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit of the apparatus executes the computer executable program code to direct the apparatus to perform the process.

Figure 2:
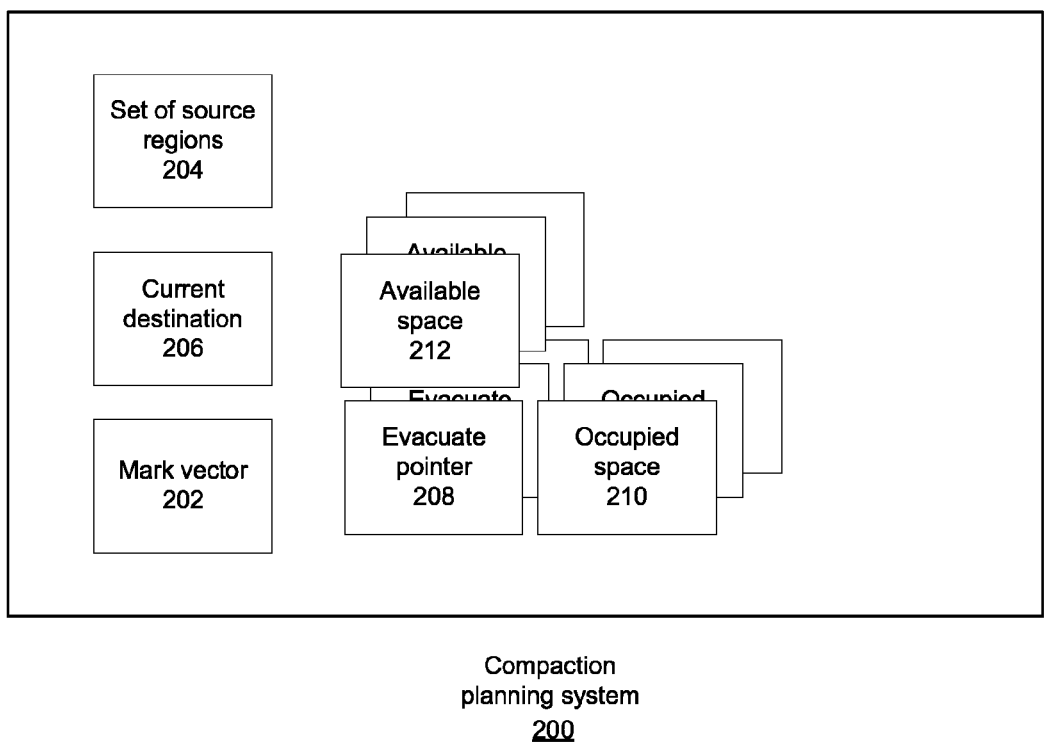
FIG. 2 is a block diagram of a compaction planning system, in accordance with various embodiments of the disclosure.

With reference to FIG. 2, a block diagram of a compaction planning system, in accordance with various embodiments of the disclosure is presented. Compaction planning system 200 is an example of an embodiment of the disclosed compaction planning process.

An embodiment of compaction planning system 200 is supported by a data processing system, for example, data processing system 100 of FIG. 1. Compaction planning system 200 comprises an number of components working in combination with the components of the data processing including mark vector 202, set of source regions 204, current destination 206, evacuate pointer 208, occupied space 210, and available space 212.

Mark vector 202 is a data structure containing an entry for each live object within a memory space that is to be processed. Mark vector 202 provides information for a live object including a size that is used in further space calculations.

Set of source regions 204 is a data structure containing areas of the memory to be processed. The defined separate memory areas can be processed separately and concurrently using the disclosed process. The disclosed process operates on each source region of the set of source regions in parallel. The computational resources available determine the degree of parallelism but the operational granularity is limited to a single region. Although a number of threads may be executing to compact a number of source regions a source region is not locked during processing because the source region is viewed as a local resource to an executing thread.

Current destination 206 is a data structure containing an atomically modified pointer to a region currently used as a compact destination for all threads. Current destination 206 is a global data item visible to all threads. The value of current destination 206 is NULL when a destination has not yet been selected or when a previous destination was filled and another destination has not yet been selected.

Per region data comprises a set of data items including evacuate pointer 208, occupied space 210, and available space 212. Each set of data items is associated with a specific region of set of source regions 204. Evacuate pointer 208 is a data structure containing a pointer to the first object to be copied from a region. Initially evacuate pointer 208 points to the first object in the region. Occupied space 210 is a data structure containing a value of the number of bytes that must be copied from a source region. The value represents the size of objects that will be planned to move. Available space 212 is a data structure containing a value of the number of bytes that remain for a copy destination in a region.

Figure 3:
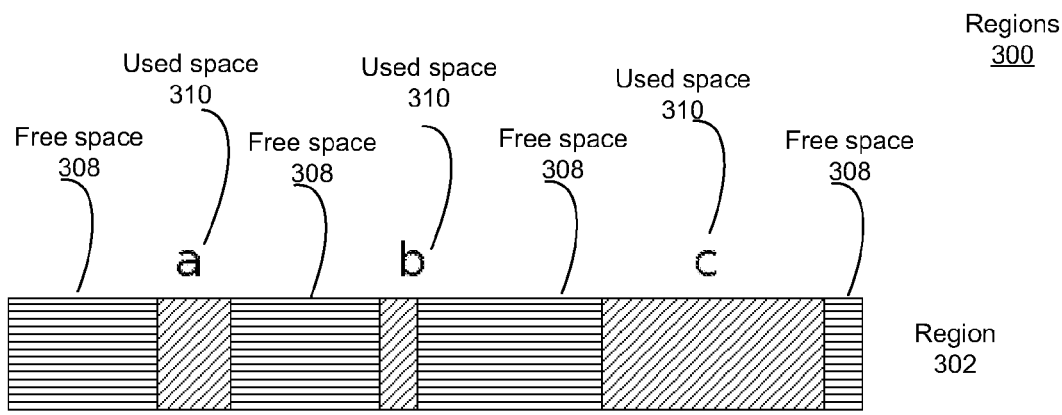
FIG. 3 is a block diagram of regions, in accordance with one embodiment of the disclosure.
Figure 3:
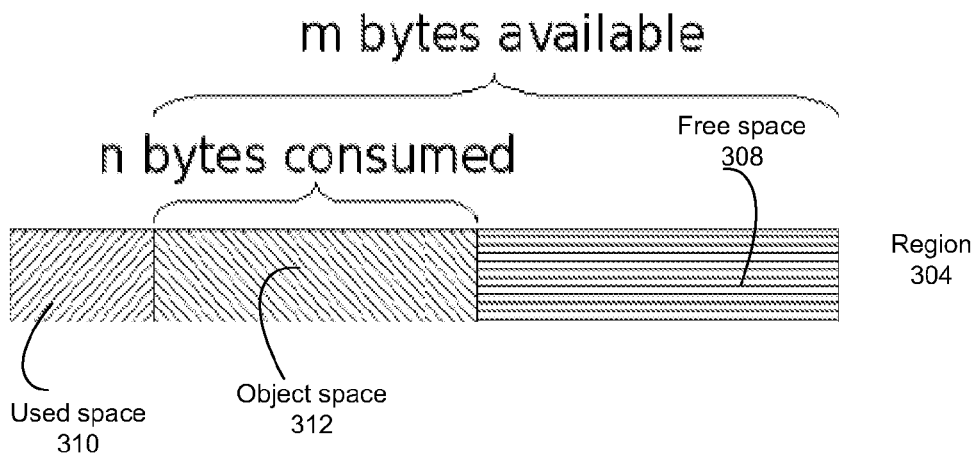
Figure 3:
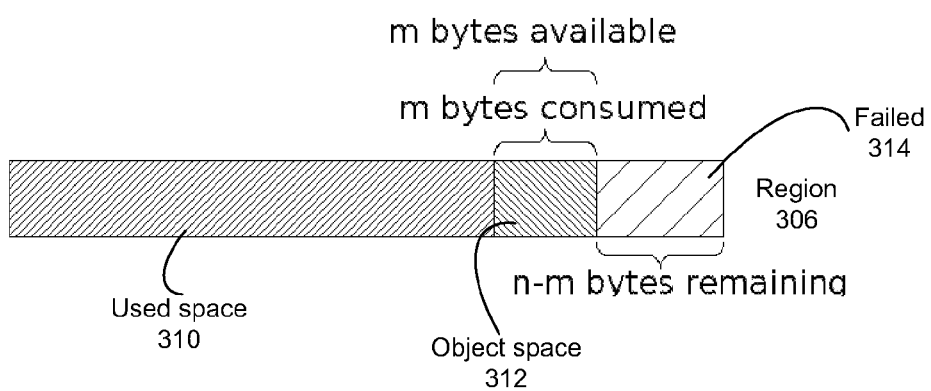

With reference to FIG. 3, a block diagram of regions, in accordance with one embodiment of the disclosure is presented. Regions 300 is an example of a set of source regions 204 of compaction planning system 200 of FIG. 2.

In one example, region 302 contains a number of elements of used space and free space. Free space 308 indicates areas within region 302 that are available for storage use. Used space 310 represents areas of region 302 that are presently used for storage and have been occupied by data and are no longer available. Compaction attempts to consolidate used space 310 within region 302 typically causing free space 308 to be redistributed and consolidated but not reduced. In the example, total used space, n bytes occupied, may be determined by a sum of the entries for used space 310 (represented as a+b+c).

The compaction planning system of the disclosure records information about the size of all live objects in the mark vector as a first phase of planning for each region, such as region 302. The total live object size of the region is recorded as the total number of bytes that all of the objects in this region will occupy once compacted.

In the example of region 304 the region has used space 310 and a number of available bytes. The number of bytes available is represented as m bytes available, comprising the sum of object space 312 and free space 308. The m bytes available represent space available as a copy destination for object relocation.

In the example of region 306, the region has used space 308, object space 312 and a failed space 314. As before m bytes available represent space available as a copy destination for object relocation. However in this example m bytes was consumed by object space 312. Failed space 314 represents n−m bytes remaining, typically a space into which no object can be copied and therefore another region must be used as a destination.

Figure 4:
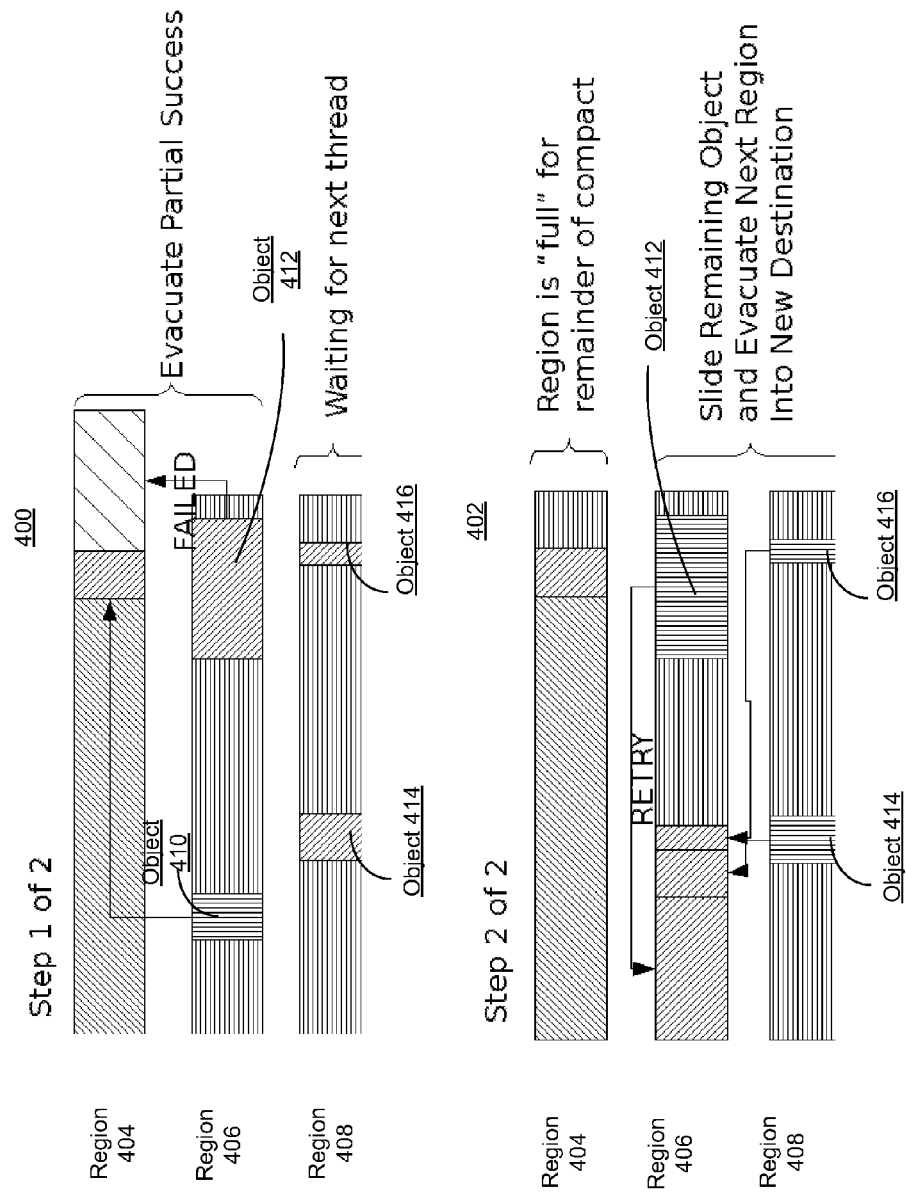
FIG. 4 is a block diagram of cross-region compaction, in accordance with one embodiment of the disclosure.

With reference to FIG. 4, a block diagram of cross-region compaction, in accordance with one embodiment of the disclosure is presented. Regions 400 and regions 402 are examples of a set of source regions 204 of compaction planning system 200 of FIG. 2.

Regions 400 depicts an example of object movements in a set of regions comprising region 404, region 406 and region 408 during a first step of a compaction process. An attempted move to relocate object 410 and object 412 from region 406 to space in region 404 occurs in the first step. Movement of object 410 is successful however movement of object 412 failed. The status of a compaction of elements of region 406 into region 404 is noted as evacuate partial success. An element was relocated while another element was not. Region 404 has a portion of space remaining unused. Region 408 contains object 414 and object 416 awaiting a next thread for processing.

Regions 402 continues the example of regions 400. In the example of regions 402, region 404 is full for the remainder of the process of the example. Region 404 is full as a result of previous use to contain objects and the relocation of object 410.

Having evacuated object 410 from region 406, space is available to slide object 412 forward to the base of region 406 in a retry operation. Object 414 and object 416 can be relocated into region 406 from region 408 as indicated by arrows from region 408 to region 406.

Embodiments of the disclosed process enable a compaction phase to be planned in parallel without waits. The compaction plan resulting from using embodiments of the disclosed process is near optimal. Limited fragmentation can exist at the end of a compaction area when using embodiments of the disclosed process, but the fragmentation can typically be bounded to arbitrarily small values.

The disclosed process is designed for a region-based garbage collector (see, for example, Detlefs et al Detlefs, D., Flood, C., Heller, S., Printezis, T., "Garbage-First Garbage Collection", ISMM'04, pp. 37-48, 2004). Rather than attempting to move all objects to the lowest area of a large, unified heap, embodiments of the disclosed process divide the heap into a number of regions, for example, region 404, region 406 and region 408 and only attempts to achieve optimal compaction within defined regions, as seen in the process example using regions 400 and regions 402. Embodiments of the disclosed process can be easily modified to operate on a unified heap by virtualizing region semantics.

Embodiments of the disclosed process collect the size of all the objects in a region prior to planning the movement destinations of the objects in a region to be compacted. Embodiments of the disclosed process thus enable determination of the amount of memory that will be consumed by combining any set of regions whereby selecting a region as the destination of another region requires only one atomic operation to consume from the free memory counter of the destination. The work of planning the precise destinations of all objects in the source region can then proceed, in parallel, without locking the destination. The absence of locking enables other regions to use the same region as a destination without compromising parallelism. Embodiments of the disclosed process also enable regions to be grouped together into "compact groups" ensuring certain properties of regions are preserved. For example, regions may be grouped together by age, by allocating thread, or by NUMA affinity as an optional feature.

Figure 5:
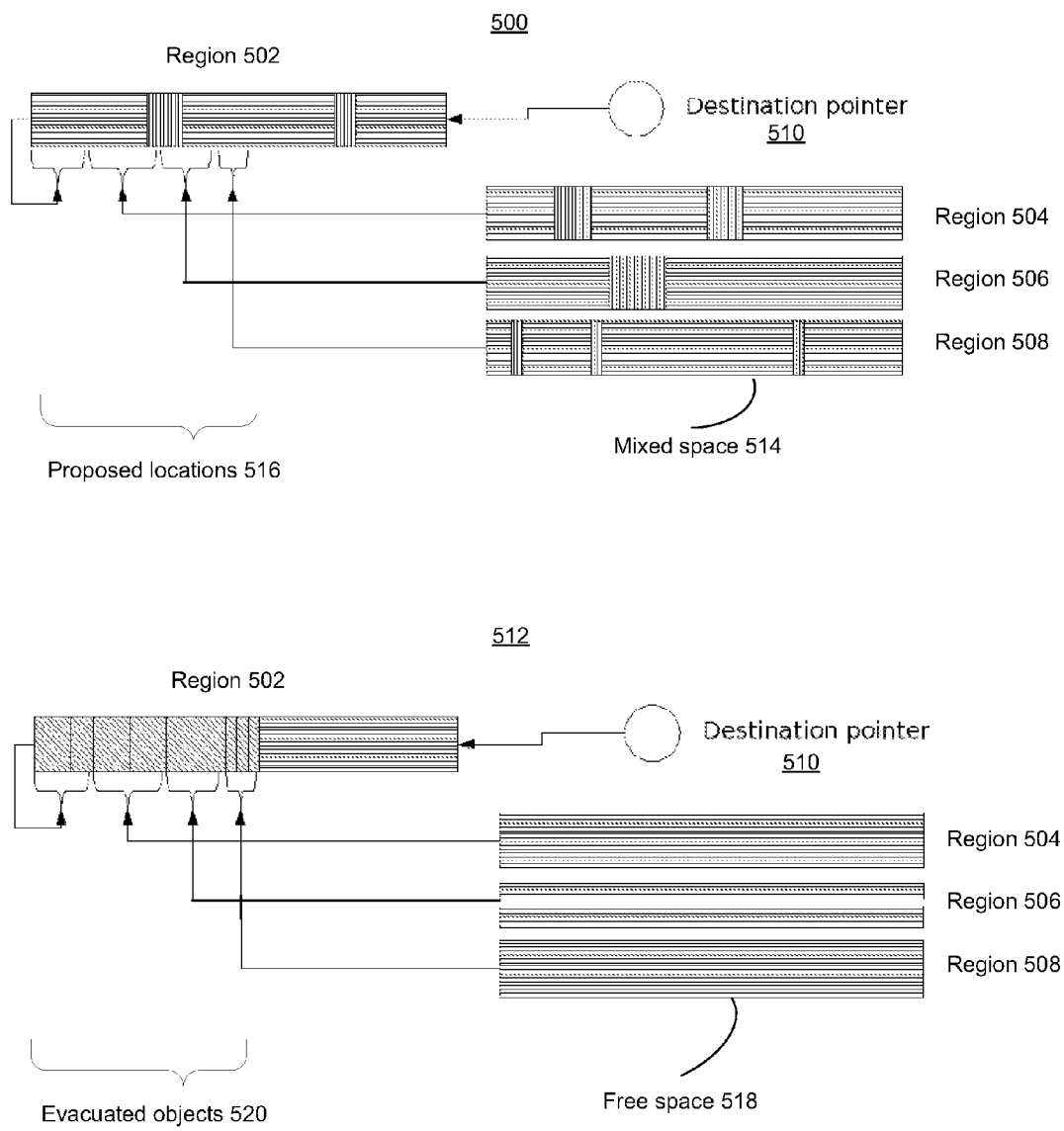
FIG. 5 is a block diagram of cross-region compaction, in accordance with one embodiment of the disclosure.

With reference to FIG. 5, a block diagram of cross-region compaction, in accordance with one embodiment of the disclosure is presented. Regions 500 and regions 512 are examples of a set of source regions 204 of compaction planning system 200 of FIG. 2.

Regions 500 represent an initial view of object placement before a compaction planning process involving object relocation occurs. Regions 500 is a set of regions comprising region 502, region 504, region 506 and region 508 in which a combination of free space and used space may be found forming mixed space 514. Destination pointer 510 is directed toward region 502 indicating region 502 is a destination for object relocation as a result of compaction processing for region 502 as well as remaining region 504, region 506 and region 508.

Planning occurs for objects currently located in mixed space 514 of region 502, region 504, region 506 and region 508 for relocation to proposed locations 516. Movement of the objects occurs after the planning phase. An arrow associated with each source region of region 502, region 504, region 506 and region 508 indicates a respective object movement to a corresponding planned position within a destination region of region 502.

Regions 512 represent a view of object placement after a compaction planning process involving object relocation occurs. Regions 512 is a set of regions comprising region 502, region 504, region 506 and region 508 however mixed space 514 in has been replaced by free space 516 in region 504, region 506 and region 508. Destination pointer 510 indicates region 502 as a destination for object relocation during compaction processing for region 502 as well as the remaining regions region 504, region 506 and region 508 as before.

The planning for objects previously located in mixed space 514 of region 502, region 504, region 506 and region 508 for new locations in proposed locations 516 enables the relocation portion of compaction to occur. Evacuated objects 520 represents the result of movement of objects from previous positions in respective locations of region 502, region 504, region 506 and region 508 into the destination region of region 502.

The example indicates a capability for multiple regions comprising region 502, region 504, region 506 and region 508 to participate in the compaction operation sharing destination region of region 502. In the example region 502 is a destination for compaction of objects within region 502 as well as hosting a destination for compaction relocation of objects from other regions including region 504, region 506 and region 508.

Figure 6:
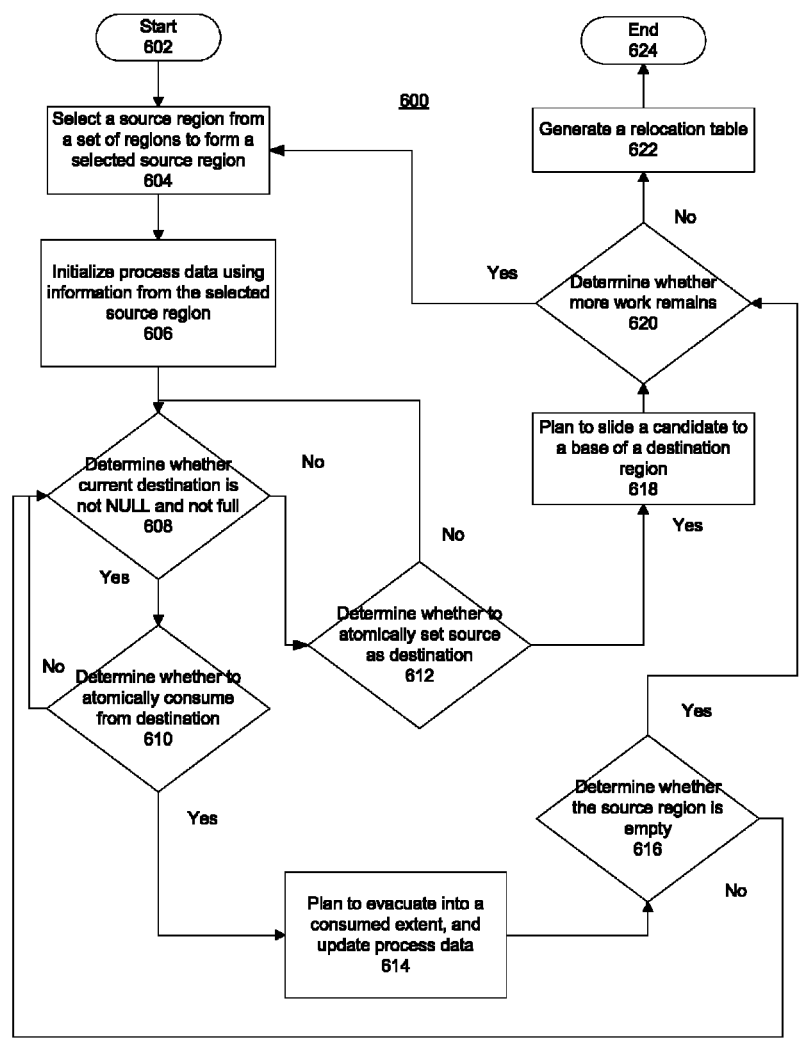
FIG. 6 is a flowchart of a compaction planning process, in accordance with one embodiment of the disclosure.

With reference to FIG. 6, a flowchart of a compaction planning process, in accordance with one embodiment of the disclosure is presented. Process 600 is an example of a process using compaction-planning system 200 of FIG. 2. Process 600 begins (step 602) and selects a source region from a set of regions to form a selected source region (step 604). Process 600 receives and records information about the size of all live objects in a mark vector as a first phase of planning for each source region. The total live object size of the region is recorded as the total number of bytes that all of the objects in the selected region will occupy once compacted. Process 600 accordingly initializes process data using information from the selected source region (step 606). The initialization comprises receiving a count of occupied bytes, sets available space, and sets an evacuation candidate using the selected source region.

Once the occupied size is set, process 600 determines whether a current destination exists (not NULL) and is not full (step 608). When a determination is made that a current destination exists and is not full process 600 attempts to atomically subtract the occupied size from the available space of the destination region (this atomic is a "saturating subtract" so that the available space is never negative). In doing so, process 600 determines whether it is capable to atomically consume from destination (step 610).

When process 600 determines it is not capable to atomically consume from destination, process 600 loops back to perform step 608 as before. When process 600 determines it is capable to atomically consume from destination, the thread of process 600 now "owns" the available space, which was decremented and can use the space as a copy destination (since the base of the region and total region size are known, the old and new available space describe a unique extent of memory). Since the decrement was atomic, there is no locking required to reserve this memory and there is no possibility of another thread consuming an overlapping extent since that would have caused the atomic to fail. When the available space of a destination is reduced to zero with the atomic, the destination is considered "full."

Since consuming from the destination succeeds (a failure restarts from the top), process 600 plans to evacuate in a consumed extent, updates the process data (step 614). The process data being updated comprises information containing evacuation candidate, occupied bytes and available space information. Process 600 begins calculating per-object destinations of all objects in the selected source region (starting at "evacuate pointer") in the memory extent consumed from the destination region. When all of the objects cannot fit (due to the occupied size of the source being greater than the available space of the destination—see previous point regarding the "saturating subtract"), the occupied size is decremented by a number of bytes for which a move was planned, the evacuate pointer is updated to point to the first object which could not be copied, and process 600 retries to find a destination with a reduced occupied size.

Process 600 determines whether the source region is empty (step 616). When a determination is made that the source region is not empty, process 600 loops back to perform step 608 as before. When a determination is made that the source region is empty, process 600 skips ahead to step 620.

When a determination is made that the current destination region is NULL or already full in step 608, process 600 sets available space of the selected source region to be the total region size minus occupied bytes, atomically installs the selected source region as the current destination and determines whether atomically set source as destination (step 612). When a determination is made that atomically set source as destination did not succeed, process 600 loops back to perform step 608 as before. When a determination is made that atomically set source as destination succeeded, process 600 begins planning the destinations of each object in its region, given that process 600 consumed the "first required bytes" of the region, process 600 "owns" the beginning of the region and uses that as a destination to plan to slide to the base of the region (step 618). Thread contention can cause the installation of this region as the destination to fail but that case is handled by attempting to consume from this new destination as though the destination had never been observed as NULL. When the available space of a region has been decremented by an amount of the remaining memory in the region, the internal compaction (within the region) and the compaction of other regions into this region can be freely planned in parallel because installing the region as the current destination is the point where the region becomes exposed to other threads (of other process 600 processes) these counters need to be updated first.

Process 600 determines whether more work remains (step 620). When a determination is made that more work remains process 600 loops back to perform step 604 as before. When a determination is made that more work does not remain process 600 generates a relocation table (step 622) and terminates thereafter (step 624). The relocation table is a data structure providing precise destinations of all objects in the selected source region.

Typical existing systems for object movement do not scale well across many logical processors because each thread executing the compaction planning process must acquire an exclusive lock on both of the source and destination areas of memory while relocating (or at least planning) the objects within. Further, the systems typically use the locking mechanism to determine when to evacuate one area into another area rather than to determine when to slide objects within an area. As thread contention increases, the determination tends to increase the number of areas compacted using sliding (since only one lock could be acquired) which typically results in a given contiguous free memory extent less likely to be larger than the size of a compaction area. The less aggressive compaction result tends to negate the purpose of a compaction.

In contrast, embodiments of the compaction planning process just described only require locking a source area (the lock is "implied" in that a single source region is the granule of parallelism of the thread). Using embodiments of the compaction planning process reduces contention, enabling a worst-case number of work units, which can be executed in parallel for n memory areas to double from n/2 to n. Furthermore, consuming memory from a destination area requires only an atomic operation which enables an immediate decision regarding which objects will be evacuated from an area compared with which objects will slide within the area (this atomic makes the decision and then the actual planning can be done without locking the destination). The absence of locking means aggressiveness of compaction work is no longer dependent upon thread contention and is now purely an artifact of the geometry of objects within the compacted areas. Large objects mixed with smaller objects can sometimes still result in waste at the end of destination regions but this possibility does not change, no matter how many threads are executing the compaction planning process.

The compaction planning process typically produces a "near-optimal" compaction since there are still a few opportunities (depending on object representation implementation) for wasted memory. In one example, an amount of memory is wasted at the very end of a destination region, which is less than the total size of the largest object in the source region. While typical workloads result in the amount being an insignificantly small amount of memory (usually less than 1% of the total region size), a workload with several large objects dispersed throughout the heap could allow the waste to become appreciably large. In another example, in object representations where instances can change size when moving, the compaction planning process must pessimistically choose the larger of the sizes. However, given that most applications of object resizing typically only involve growth on a move and the compaction planning process will move almost all the objects provided (only the first few objects of the first region to be made a destination will tend to not move), the pessimistic sizing is almost always the correct one. A small amount of space could be wasted at the end of the extent consumed in the destination when the pessimistic sizing is not correct, however.

The compaction planning process assumes that the heap is broken into "regions" of objects, which can be used as logical units of compact work. The compaction planning process could be modified to operate on a unified heap by virtualizing region semantics. This would likely involve a single-threaded pre-pass to build a virtual region table subject to constraints. For example, regions can never start in the middle of an object (ideally regions start at the beginning of an object but this is not required). In another example, an object inside a region cannot extend beyond the end of a region (always starting a region at the beginning of an object trivially ensures that this requirement holds). In another example, region size determination has trade-offs including where larger regions result in lower worst-case fragmentation and less contention on the destination region but also less parallel work so an increase in idleness and a reduction in scalability.

Thus in one illustrative embodiment, a computer-implemented process for compaction planning selects a source region from a set of regions to form a selected source region, initializes process data using information from the selected source region and responsive to a determination that a current destination is not NULL and not full, determines whether to atomically consume from a destination. Responsive to a determination to atomically consume from a destination, the computer-implemented process plans to evacuate into a consumed extent and updates the process data and responsive to a determination that the source region is empty, determines whether more work remains. Responsive to a determination that more work does not remain, the computer-implemented process generates a relocation table.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The invention claimed is:

1. A computer-implemented process for compaction planning, the computer-implemented process comprising:
    performing the following by a plurality of threads in parallel:
        selecting a source region from a set of regions;

determining whether a current destination region has been designated, the current destination region having an available space value associated therewith;

determining a size value for all objects that need to be copied from the selected source region to the current destination region;

responsive to determining that the current destination region has been designated and the current destination region is not full, atomically subtracting the determined size value from the available space value; and responsive to atomically subtracting the determined size value from the available space value, consuming an extent in the current destination region having a size roughly equivalent to the size value and planning to evacuate the objects into the consumed extent.

2. The computer-implemented process of claim 1 wherein selecting the source region from the set of regions further comprises:

dividing a memory into a number of regions to form the set of regions.

3. The computer-implemented process of claim 1 further comprising:

setting an evacuation pointer to point to a first object to be copied from the selected source region.

4. The computer-implemented process of claim 1 further comprising, in response to determining that the current destination region has not been designated, determining whether to set the selected source region as the current destination region.

5. The computer-implemented process of claim 4 further comprising, in response to setting the selected source region as the current destination region, sliding the objects to a base of the current destination region.

6. The computer-implemented process of claim 1 further comprising, in response to determining that the selected source region is empty, determining whether more work remains.

7. The computer-implemented process of claim 6 further comprising, in response to determining that no more work remains, generating a relocation table that contains destinations of each of the objects.

8. A computer program product for compaction planning, the computer program product comprising:

a non-transitory computer-readable storage medium containing computer executable program code for execution by a plurality of threads in parallel, the computer executable program code comprising:

computer executable program code for selecting a source region from a set of regions;

computer executable program code for determining whether a current destination region has been designated, the current destination region having an available space value associated therewith;

computer executable program code for determining a size value for all objects that need to be copied from the selected source region to the current destination region;

computer executable program code for, responsive to determining that the current destination region has been designated and the current destination region is not full, atomically subtracting the determined size value from the available space value; and computer executable program code for, responsive to atomically subtracting the determined size value from the available space value, consuming an extent in the current destination region having a size roughly equivalent to the size value and planning to evacuate the objects into the consumed extent.

9. The computer program product of claim 8 wherein selecting the source region from the set of regions further comprises:

dividing a memory into a number of regions to form the set of regions.

10. The computer program product of claim 8 further comprising:

computer executable program code for setting an evacuation pointer to point to a first object to be copied from the selected source region.

11. The computer program product of claim 8 further comprising computer executable program code for, in response to determining that the current destination region has not been designated, determining whether to set the selected source region as the current destination region.

12. The computer program product of claim 11 further comprising computer executable program code for, in response to setting the selected source region as the current destination region, sliding the objects to a base of the current destination region.

13. The computer program product of claim 8 further comprising computer executable program code for, in response to determining that the selected source region is empty, determining whether more work remains.

14. The computer program product of claim 13 further comprising computer executable program code for, in response to determining that no more work remains, generating a relocation table that contains destinations of each of the objects.

15. An apparatus for compaction planning, the apparatus comprising:

at least one processor;

at least one memory device operably coupled to the at least one processor and storing program code for execution by a plurality of threads in parallel on the at least one processor, the program code causing the at least one processor to:

select a source region from a set of regions;

determine whether a current destination region has been designated, the current destination region having an available space value associated therewith;

determine a size value for all objects that need to be copied from the selected source region to the current destination region;

responsive to determining that the current destination region has been designated and the current destination region is not full, atomically subtract the determined size value from the available space value; and responsive to atomically subtracting the determined size value from the available space value, consume an extent in the current destination region having a size roughly equivalent to the size value and plan to evacuate the objects into the consumed extent.

16. The apparatus of claim 15 wherein the program code further causes the at least one processor to:

divide a memory into a number of regions to form the set of regions.

17. The apparatus of claim 15 wherein the program code further causes the at least one processor to:

set an evacuation pointer to point to a first object to be copied from the selected source region.

18. The apparatus of claim 15 wherein the program code further causes the at least one processor to, in response to determining that the current destination region has not been designated, determine whether to set the selected source region as the current destination region.

19. The apparatus of claim 18 wherein the program code further causes the at least one processor to, in response to setting the selected source region as the current destination region, slide the objects to a base of the current destination region.

20. The apparatus of claim 15 wherein the program code further causes the at least one processor to, in response to determining that no more work remains, generate a relocation table that contains destinations of each of the objects.

* * * * *